No. 633,135. Patented Sept. 19, 1899.
J. HARDT.
MEAT GRINDER.
(Application filed Mar. 23, 1899.)
(No Model.) 2 Sheets—Sheet 1.

Witnesses:
J. Halpenny
M. E. Marsh.

Inventor
Julius Hardt
By Carter & Shaver
Attys

THE NORRIS PETERS CO., PHOTO-LITHO., WASHINGTON, D. C.

No. 633,135. Patented Sept. 19, 1899.
J. HARDT.
MEAT GRINDER.
(Application filed Mar. 23, 1899.)
(No Model.) 2 Sheets—Sheet 2.
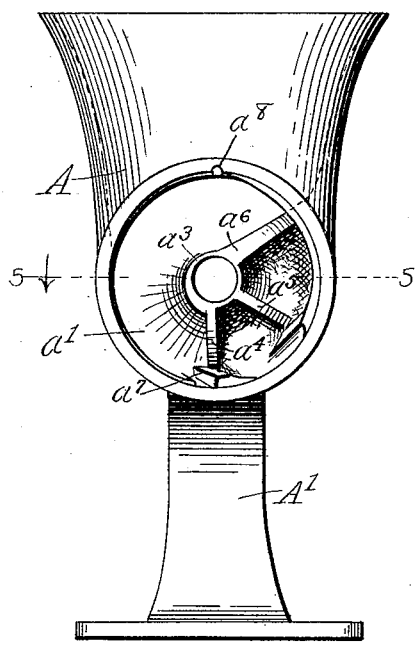
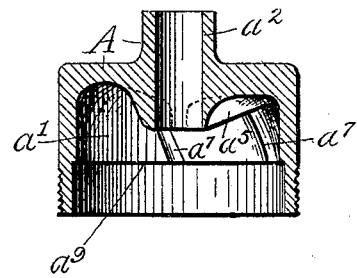
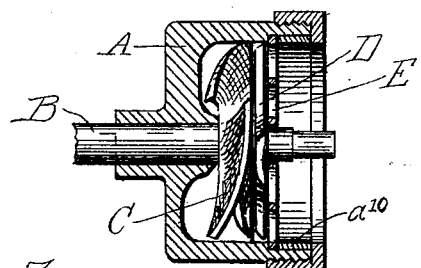
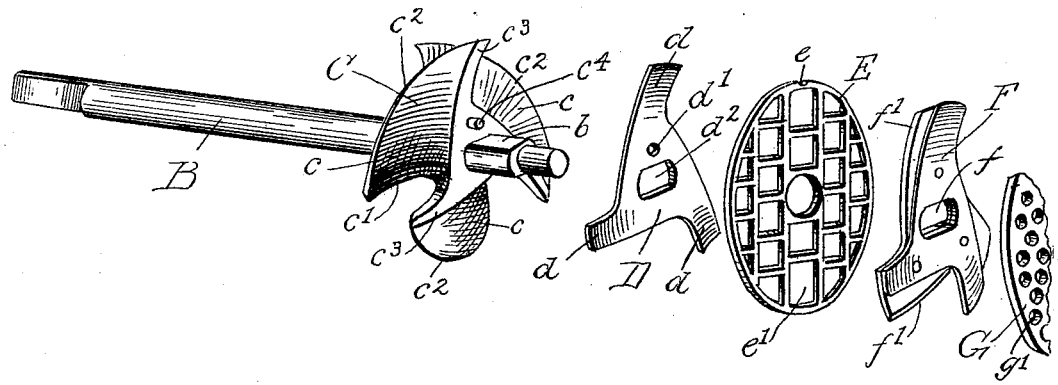
Witnesses:
J. Halpenny
M. E. Marsh
Inventor:
Julius Hardt
By Carter & Graves
Attys.

UNITED STATES PATENT OFFICE.

JULIUS HARDT, OF CHICAGO, ILLINOIS.

MEAT-GRINDER.

SPECIFICATION forming part of Letters Patent No. 633,135, dated September 19, 1899.

Application filed March 23, 1899. Serial No. 710,157. (No model.)

*To all whom it may concern:*

Be it known that I, JULIUS HARDT, of Chicago, in the county of Cook and State of Illinois, have invented certain new and useful Improvements in Meat-Grinders, of which the following is a specification.

This invention relates to improvements in machines for cutting or grinding meat and is designed to be applicable to such devices either as constructed for household use or for the butchering trade.

The object of the invention is to so improve machines of this character as to greatly reduce the labor involved in grinding any given quantity of meat and to reduce the time required for the operation with any given size of machine and also to improve the quality of the product by insuring the cutting of the meat instead of the mere tearing apart and crushing of it.

The invention consists in the matters hereinafter set forth, and particularly pointed out in the appended claims, as interpreted in connection with the accompanying drawings, in which—

Figure 1:
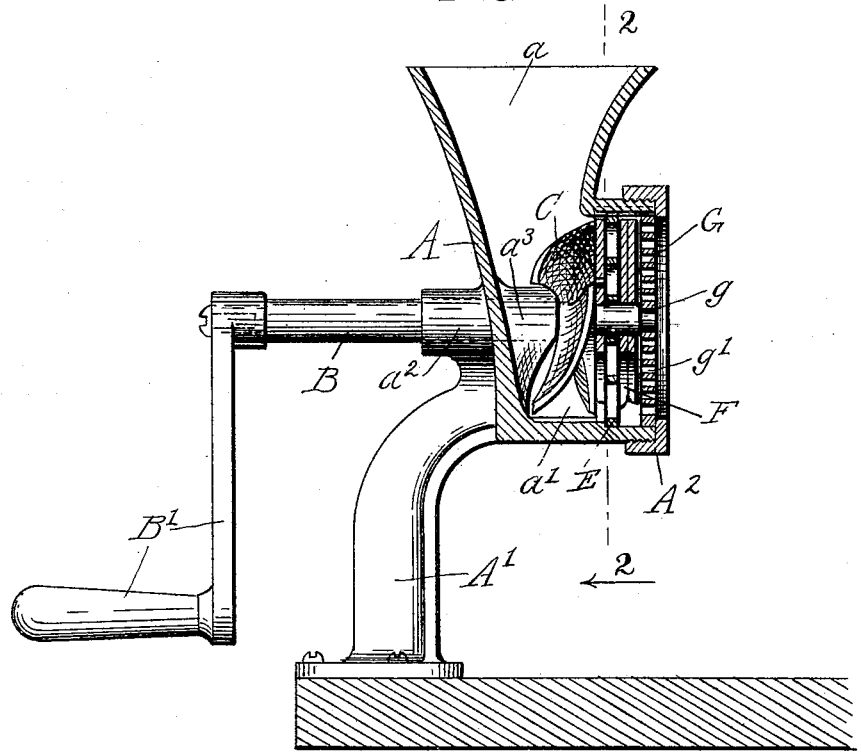
Figure 2:
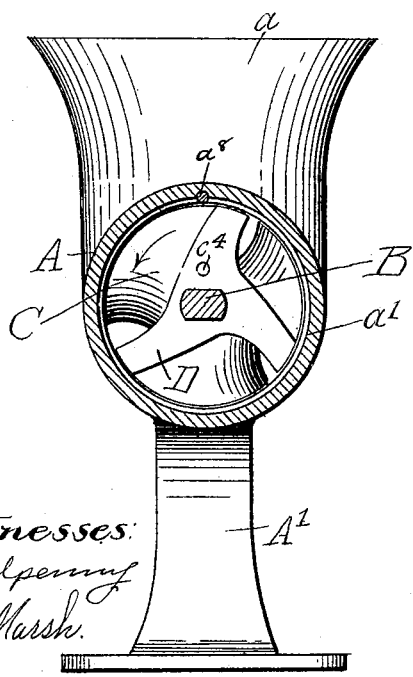
Figure 3:
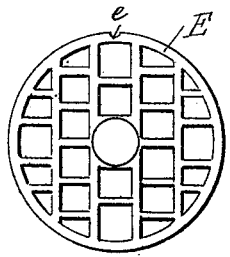

Figure 1 is a sectional elevation of a meat-grinding machine constructed in accordance with my invention. Fig. 2 is a front sectional elevation taken on line 2 2 of Fig. 1. Fig. 3 is a detail of the inner perforated plate. Fig. 4 is a front elevation of the machine-casing with the cutters and shaft and perforated plates removed. Fig. 5 is a top plan section thereof, taken on line 5 5 of Fig. 4. Fig. 6 is a sectional detail showing the preferred arrangement for cutting fat for sausages and the like. Fig. 7 is a general perspective view of the shaft and the several cutters and perforated plates.

In said drawings, A designates the main casing or frame, which is usually made of cast-iron, with an upper hopper portion $a$ and a lower grinding-chamber $a'$, into which said hopper discharges, the casing being supported upon any suitable base or foot A', which is desirably made of such shape as to be capable of being conveniently screwed or clamped to a table. Extending horizontally through the casing and axially of the grinding-chamber $a'$ thereof is a shaft B, mounted in a bearing $a^2$ of the casing and arranged to be rotated in any suitable manner, as by a crank B'.

The movable cutters of the grinder are all mounted on this shaft within the grinding-chamber. The innermost of these cutters and that which first acts upon the meat is a bladed screw C, the construction of which is more clearly shown by Fig. 7. As herein shown, it is permanently fastened to the shaft B, (although it may be detachably keyed thereto,) and said shaft is inserted from the open end of the grinding-chamber, the crank B' being made detachable for this purpose. The blades $c$ of this screw are made with cutting edges at both their inner or rear edges and at their periphery. The rear cutting edges $c'$ of the blades are of concave shape in side view, as better shown in Fig. 1, so that the screw at this end fits around a forwardly-projecting boss $a^3$, provided on the inner rear wall of the casing around the shaft B and forming a continuation of the bearing $a^2$, in which said shaft is mounted. The region above and to the left of this boss (looking directly into the open end of the casing) is left unobstructed to form an entrance-passage through which the meat enters from the hopper; but a number of ribs $a^4$, $a^5$, and $a^6$ extend radially from said boss back to the rear wall of the casing and provide stationary cutting edges, against which said cutting edges $c'$ of the screw-blades act to cut the meat. In a similar manner the peripheral cutting edges $c^2$ of the screw-blades act against stationary cutting edges provided by one or more ribs $a^7$ on the inner periphery of the casing opposite the screw.

The second cutter D consists of a thin flat plate shaped with blades $d$, which fit against and conform to the inner or front edges $c^3$ of the screw-blades. (See Fig. 7.) As herein shown, a pin $c^4$ projects from the face of said screw through an aperture $d'$ in the cutter D to insure of their being rigidly held in correct operative position, and to the same end the cutter is fitted over a flattened portion $b$ of the shaft B by an oblong shaping of its shaft-opening $d^2$, so that it is thereby also held to revolve with the shaft and screw. Any other connection for holding the parts rigidly together for this purpose might, however, be employed with the same results. The cutter D acts against the inner face of a perforated plate E, which is inserted over the end of the shaft B and within the mouth of the casing against an annular shoulder $a^9$ therein, said cutter being arranged to rotate in close contact with said plate, and the latter being held stationary by a key $a^8$ on the casing entering a corresponding notch $e$ in the periphery of the plate or by any equivalent device.

Immediately in front of the perforated plate E a third cutter F is mounted on the shaft B to rotate therewith, its shaft-aperture $f$ being also made oblong to fit over the flat portion $b$ of said shaft. This cutter is of the same general shape as the cutter D, and its cutting edges $f'$ act against the face of the plate E to cut the meat against the edges of the apertures $e'$ of the latter as it is forced through said aperture. An outer perforated plate G, which appears in section in Fig. 1 and a fragment of which is shown in Fig. 7, then fits into the mouth of the casing and is held in place therein by a flanged collar $A^2$, that screws over the open end of the casing, said outer plate being held against rotation in the same manner as plate E and being provided with a central aperture $g$, fitting over the shaft and serving as an end bearing for the latter. The perforations $g'$ in the plate G, through which the meat is finally forced, may be made of any suitable size or shape, but will ordinarily be considerably smaller than the apertures $e'$ in the plate E, and are herein shown as round instead of rectangular or triangular, as in the latter plate. A wide variety of changes in these details will, however, not affect the principle of construction.

In the operation of the machine thus described the screw G acts both as a cutter and as a forcing-screw by which the meat dropped into the hopper is pressed forward to be acted on by the subsequent cutters and to pass through the perforated plates. This construction and arrangement of said screw and of the coöperative parts of the casing, together with the provision of the cutters D and F, so that they act against the opposite sides of the intermediate stationary perforated plate E, is found in practice to effect a much cleaner and easier cutting action on the meat and to largely overcome the tearing and mashing of the fiber, which so commonly occurs in previous devices of this character. As a consequence, it is found that the machine is not only much more rapid in its action and easier to operate, but that the chopped or hashed product is of superior quality. The object of making the apertures of the inner plate E of the shape illustrated appears when considered in connection with the sausage-making industry in which it is considered desirable to cut the fat of the meat used into approximately small cubes. This is ordinarily a somewhat slow and laborious process, which must be carried on by hand, but can be quickly and easily accomplished with equally satisfactory results by the improved machine described when arranged as shown in Fig. 6. The only peculiarity of this arrangement consists in the omission of the outer cutter F and plate G, the plate E being held back in position by a ring $a^{10}$, that is inserted in the mouth of the casing and held in by the flange of the collar $A^2$. When the machine is operated with this adjustment, the fat comes through in approximately the cubical shape desired, and the action is found to take place very rapidly, so that a large quantity of fat can thus be cut up for sausage-making purposes in a very short time as compared with the time required to obtain equally satisfactory results by any method or means heretofore known.

It will be observed that a peculiar advantage accrues from the utilization of both the inner or rear edges and the peripheral edges of the screw-blades as cutting edges, this advantage consisting in materially increasing the length of the cutting edges of the screw without increasing the length of the screw, thereby increasing the capacity of the machine for any given length of forcing-screw and also doing away with all tearing edges, which crush the life and juice out of the meat and produce an inferior product. I prefer that the said inner edges be concaved or dished radially in order that the cutting action against their ribs $a^5$ shall be that of shear cut, and thereby cut the meat cleanly and without crushing it. This form of cutting edge also serves to more effectively and more uniformly draw the meat from the hopper, and this uniformity of feed is assisted by placing the stationary cutting edges of ribs $a^4$, $a^5$, and $a^6$ below and at one side of the shaft-bearing on the inward-extending boss, leaving the upper and opposite sides of the boss free to coact with the cutting edges $c'$ in bringing down the meat. The capacity of the machine is further increased and the quality of its product is further improved by the peculiar arrangement at the discharge end of the cutting-chamber, the special advantage of this arrangement being that the meat is finely and gradually cut up without crushing it. The first perforated plate E and its coacting cutters subject the meat to the first chopping action, chopping it into comparatively large cubes. The intermediate cutter F is set away from the second perforated plate G, so that the flat rectangular pieces that come from the first plate E have a chance to commingle and form a substantially homogeneous mass before they are finally pressed through the finer perforations of the final plate. In this manner the reduction in size is gradually accomplished and crushing and tearing of the fiber are thereby materially avoided. Setting the final perforated plate away from the intermediate cutter enables the perforations in said plate to be made finer and more numerous than in the first plate and to be located out of alinement with those of the first plate, and using a removable final plate with smaller perforations enables the machine to be converted into a fat-cutting device at will by the removal of this final plate. It will also be seen that thus supporting the final disk away from the final cutter enables the entire area of the disk to be perforated, with the combined area of these perforations equal to the combined area of the perforations of the first plate, so that packing of the half-chopped meat in the chamber between the plates is avoided.

Although primarily designed for a machine for cutting meat, it will of course be understood that the improvements thus described may be used to advantage in a vegetable-cutter or in any other connection for which they may be found adapted. It will also be understood that various changes in the details of the construction described may be made without departing from the broad spirit of the invention claimed.

I claim as my invention—

1. The combination with the cylindrical casing, open at its rear end and closed at its forward end and provided with a hopper discharging into it at its rear end, the said rear end wall being provided with a central, inward-extending boss surrounding a shaft-opening, said boss being provided with one or more cutting ribs or edges extending from near the shaft-opening in the boss to the cylindrical side wall of the chamber and located at one side of the boss, the opposite side of the boss and its upper side being free of obstructions, a shaft journaled in the center of said boss and provided with a forcing-screw provided with peripheral cutting edges $c^2$ and cutting edges $c'$ on the rear end edges of said blades, said cutting edges being curved correspondingly to the boss on the rear wall of the cutting-chamber, and a perforated plate at the discharge end of the cutting-chamber, substantially as set forth.

2. A grinding-machine, comprising a cylindrical casing closed at one end and open at its other end and having a hopper discharging into it near its closed end, the inner wall of said chamber being provided with longitudinal ribs $a^7$ and its end wall with substantially radial ribs extending from near the center of the end wall to the wall of the cylindrical chamber and being located at one side of the chamber, leaving the opposite side of the end wall and its upper part free of obstruction, a shaft journaled in said end wall and extending into said chamber, a forcing-screw mounted on said shaft and provided with two sets of cutting edges, one being at the peripheral edges of the blades and the other at the rear, substantially radial edges of the blades, and a perforated plate at the discharge end of the chamber substantially as set forth.

In testimony that I claim the foregoing as my invention I affix my signature, in presence of two subscribing witnesses, this 13th day of March, A. D. 1899.

JULIUS HARDT.

Witnesses:
 HENRY W. CARTER,
 ALBERT H. GRAVES.